United States Patent
Zhang et al.

(10) Patent No.: US 11,047,952 B2
(45) Date of Patent: Jun. 29, 2021

(54) MITIGATING MUTUAL COUPLING LEAKAGE IN SMALL FORM FACTOR DEVICES

(71) Applicant: QUALCOMM Incorporated, San Diego, CA (US)

(72) Inventors: Nan Zhang, San Diego, CA (US); Roberto Rimini, San Diego, CA (US); Xinjie Yang, San Diego, CA (US); Vijay Varadarajan, La Jolla, CA (US); Bo Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 16/234,717

(22) Filed: Dec. 28, 2018

(65) Prior Publication Data

US 2020/0209350 A1 Jul. 2, 2020

(51) Int. Cl.
*G01S 7/03* (2006.01)
*G01S 7/35* (2006.01)
*G01S 13/34* (2006.01)

(52) U.S. Cl.
CPC ............ *G01S 7/038* (2013.01); *G01S 7/352* (2013.01); *G01S 13/343* (2013.01)

(58) Field of Classification Search
CPC ......... G01S 7/038; G01S 7/352; G01S 13/343
See application file for complete search history.

(56) References Cited

U.S. PATENT DOCUMENTS

| | | | | |
|---|---|---|---|---|
| 4,825,214 A | * | 4/1989 | Dejaegher | G01S 7/038 342/128 |
| 5,247,306 A | | 9/1993 | Hardange et al. | |
| 9,739,871 B2 | * | 8/2017 | Obiya | G01S 13/02 |
| 10,101,438 B2 | * | 10/2018 | Subburaj | G01S 13/003 |
| 10,218,490 B1 | * | 2/2019 | Yang | G01S 7/038 |
| 10,396,459 B2 | * | 8/2019 | Ookawa | G01S 13/931 |
| 10,444,326 B2 | * | 10/2019 | Hosokawa | G01S 13/34 |
| 10,594,358 B2 | * | 3/2020 | Cheung | G01S 7/52 |
| 10,670,698 B2 | * | 6/2020 | Melzer | G01S 7/4008 |

(Continued)

OTHER PUBLICATIONS

International Search Report and Written Opinion—PCT/US2019/064124—ISA/EPO—dated Mar. 6, 2020.

(Continued)

*Primary Examiner* — Peter M Bythrow
(74) *Attorney, Agent, or Firm* — Qualcomm Incorporated (57) ABSTRACT

Apparatus and methods are disclosed for determining, on a small form factor 5G communication device, the range of a target object include receiving, at a receiving antenna of the small form factor communication device, a composite signal where the composite signal includes a target reflection signal and a mutual coupling (MC) leakage signal, generating a composite beat waveform by mixing the composite signal with an original signal, where the composite beat includes target beat and MC leakage beat waveform components, isolating the target beat waveform by subtracting from the composite beat waveform a weighted, k-delayed composite beat waveform, where for a configured k the target beat waveforms are uncorrelated and the MC leakage beat waveforms are correlated, and determining, using the target beat waveform, a range of the target object from the small form factor device.

40 Claims, 7 Drawing Sheets

*where $S_{Rx}(t) \approx S_{MC}(t) + S_{TGT}(t)$ (56) References Cited

U.S. PATENT DOCUMENTS

| | | | | |
|---|---|---|---|---|
| 10,871,549 B2* | 12/2020 | Rimini | ............ | G01S 7/023 |
| 2015/0204968 A1* | 7/2015 | Ding | ............ | G01S 13/4454 |
| | | | | 342/174 |
| 2017/0168140 A1* | 6/2017 | Hosokawa | ............ | G01S 7/40 |
| 2017/0170560 A1* | 6/2017 | Ookawa | ............ | G01S 13/93 |
| 2017/0315213 A1* | 11/2017 | Ocket | ............ | G01S 13/878 |
| 2017/0343662 A1* | 11/2017 | Boutin | ............ | G01S 13/931 |
| 2018/0074168 A1* | 3/2018 | Subburaj | ............ | G01S 13/88 |
| 2018/0106884 A1* | 4/2018 | Marr | ............ | G01S 7/292 |
| 2018/0309474 A1* | 10/2018 | Cheung | ............ | G01S 7/02 |
| 2019/0170856 A1* | 6/2019 | Iida | ............ | G01S 13/343 |
| 2019/0195984 A1* | 6/2019 | Goda | ............ | G01S 7/288 |
| 2019/0240535 A1* | 8/2019 | Santra | ............ | A63B 22/025 |

OTHER PUBLICATIONS

Skolnik M.I., "Chapter 4: MTI and Pulse Doppler Radar ED", Jan. 1, 1980 (Jan. 1, 1980), Introduction to Radar Systems (Second Edition), McGraw-Hill, SG, pp. 101-151, XP009126484, ISBN: 978-0-07-057909-5 figures 4.5. 4.6. 4.36. 4.9. 4.11.

* cited by examiner

MITIGATING MUTUAL COUPLING LEAKAGE IN SMALL FORM FACTOR DEVICES

TECHNICAL FIELD

Disclosed aspects are generally directed to Frequency Modulated Continuous Wave (FMCW) radar, and in particular to mitigating the effects of signal leakage from radiating to receiving antennas on small form factor devices.

BACKGROUND

A fifth generation (5G) standard for wireless communications calls for substantially higher data transfer speeds, greater numbers of connections, and enhanced coverage, among many other improvements. To boost data rates of up to 20 gigabits per second, communication frequencies of 15 GHz have been adopted. Operation in this frequency range is subject to limits in energy radiation exposure to humans, though, which has sparked interest in the use of Frequency Modulated Continuous Wave (FMCW) radar for human proximity detection using the communication antennas of the device. However, radiating and receiving antennas are in very close proximity because of the small form factor of a typical 5G wireless communications device, and thus an FMCW radar signal may be received by mutual coupling (MC) at very high power at the same time as a target reflection signal is received at significantly lower power where it is obscured. Conventional methods of mitigating effects of the high-power MC leakage signal include canceling it with a characterization of the signal that was stored on the 5G communication device during its manufacture. However, the actual MC signal may change over time due to various conditions and diverge from the static, stored characterization, resulting in less effective mitigation of the MC leakage and degraded performance of the FMCW radar.

Since FMCW radar may play an important role on 5G communication devices, there is a corresponding need for improved methods of mitigating mutual coupling signal leakage to enable effective detection of human proximity.

SUMMARY

Aspects of this disclosure are directed to systems and methods for mitigating the effects of high power FMCW signal leakage at a receiving antenna of a small form factor 5G communications device. Accordingly, aspects include, for example, one directed to a method of determining, on a small form factor communication device, a range of a target object, including receiving a composite signal including a target reflection signal and a mutual coupling (MC) leakage signal, generating a composite beat waveform by mixing the composite signal with an original signal, generating a target beat waveform by subtracting from the composite beat waveform a weighted, k-delayed composite beat waveform, and determining by use of the target beat waveform a range of the target object from the small form factor communication device. According to further aspects, the composite beat waveform includes a leakage beat waveform and the target beat waveform, k is a configurable to cause a k-delayed leakage beat waveform of the k-delayed composite beat waveform to be correlated with the leakage beat waveform and a k-delayed target beat waveform of the k-delayed composite beat waveform to be uncorrelated with the target beat waveform.

Another aspect is directed to an apparatus for determining, on a small form factor communication device, a range of a target object, the apparatus comprising a receiving antenna for receiving a composite signal including a target reflection signal and a mutual coupling (MC) leakage signal, a signal mixer for generating a composite beat waveform by mixing the composite signal with an original signal, a signal summer for generating a target beat waveform by subtracting from the composite beat waveform a weighted, k-delayed composite beat waveform, and a range detector for determining by use of the target beat waveform a range of the target object. According to further aspects, the receiving antenna is configured for simultaneous reception with the radiating antenna, the composite beat waveform includes a leakage beat waveform and the target beat waveform, k is a configurable parameter and configured to cause a k-delayed leakage beat waveform of the k-delayed composite beat waveform to be correlated with the leakage beat waveform, and a k-delayed target beat waveform of the k-delayed composite beat waveform to be uncorrelated with the target beat waveform.

Another aspect is directed to an apparatus for determining, on a small form factor communication device, a range of a target object, the apparatus comprising means for receiving a composite signal including a target reflection signal and a mutual coupling (MC) leakage signal, means for generating a composite beat waveform by mixing the composite signal with an original signal, means for generating a target beat waveform by subtracting from the composite beat waveform a weighted, k-delayed composite beat waveform, and means for determining by use of the target beat waveform a range of a target object. According to further aspects, the composite beat waveform includes a leakage beat waveform and the target beat waveform, k a configurable parameter, k configured to cause a k-delayed leakage beat waveform of the k-delayed composite beat waveform to be correlated with the leakage beat waveform, and k configured to cause a k-delayed target beat waveform of the k-delayed composite beat waveform to be uncorrelated with the target beat waveform.

Another aspect is directed to a non-transitory computer-readable storage medium comprising code, which when executed by a processor on a small form factor communication device, causes a determination of a range of a target object, the storage medium comprising code for receiving a composite signal including a target reflection signal and a mutual coupling (MC) leakage signal, for generating a composite beat waveform by mixing the composite signal with an original signal, for generating a target beat waveform by subtracting from the composite beat waveform a weighted, k-delayed composite beat waveform, and for receiving determining by use of the target beat waveform a range of a target object. According to further aspects, the composite beat waveform includes a leakage beat waveform and the target beat waveform, k is a configurable to cause a k-delayed leakage beat waveform of the k-delayed composite beat waveform to be correlated with the leakage beat waveform, and to cause a k-delayed target beat waveform of the k-delayed composite beat waveform to be uncorrelated with the target beat waveform.

BRIEF DESCRIPTION OF THE DRAWINGS

A more complete appreciation of the various aspects described herein and many attendant advantages thereof will be readily obtained as the same become better understood by reference to the following detailed description when considered in connection with the accompanying drawings, which are presented solely for illustration and not limitation, and in which.

DETAILED DESCRIPTION

Aspects disclosed herein are directed to mitigating mutual coupling (MC) leakage and determining a range of a target object with FMCW radar on a small form 5G communications device. An example motivation for implementing FMCW radar on a 5G communication device arises from Federal Communications Commission (FCC) requirements to maintain 5G transmission energy below limits of maximum permissible exposure (MPE) of human tissue (e.g., that of a user). More specifically, FCC regulations state that MPE for 5G millimeter wave transmissions should be less than 1 mW/cm². Millimeter wave 5G technology makes FMCW radar using built-in antennas feasible, so it is reasonable to consider implementing FMCW radar for the purposes of ranging human tissue from the 5G communications device. At close range, a reduction of transmission power may often be required to maintain MPE limits, so proximity detection of human tissue near a 5G communications device is clearly advantageous. However, FMCW radar requires that both the radiating and receiving antennas be simultaneously active, and small, ever-shrinking form factors of typical communication devices cause radiating and receiving antennas to be very closely placed. Energy leakage from the radiating antenna to the receiving antenna becomes a significant and unavoidable problem in that the relatively low energy target reflections used for range estimation are obscured by the leakage.

Disclosed herein are methods and apparatus for mitigating the effects of MC leakage in FMCW radar implemented on a 5G communications device. A composite waveform includes component MC leakage and target waveforms. Over a sample space of k, the MC leakage waveforms correlate, but the target waveforms do not. The composite waveform is tapped at time t-k, weighted, and negative-summed with the composite waveform at time t to remove the MC leakage waveform component (at time t). Thus, the remaining, much lower power, target waveform component is isolated for use in determining the range of the target. Sampling the composite waveform in this way provides a robust and adaptable alternative to the conventional method of canceling the MC leakage component with a static, stored characterization.

These and other aspects are disclosed in the following description and related drawings to show specific examples relating to exemplary aspects. Alternative aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals, including a small form factor 5G wireless communications device. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices which may communicate with a core network via a radio access network (RAN). UEs can be embodied by any of a number of types of devices including but not limited to printed circuit (PC) cards, compact flash devices, external or internal modems, wireless or wireline phones, smartphones, tablets, tracking devices, asset tags, and so on.

Figure 1:
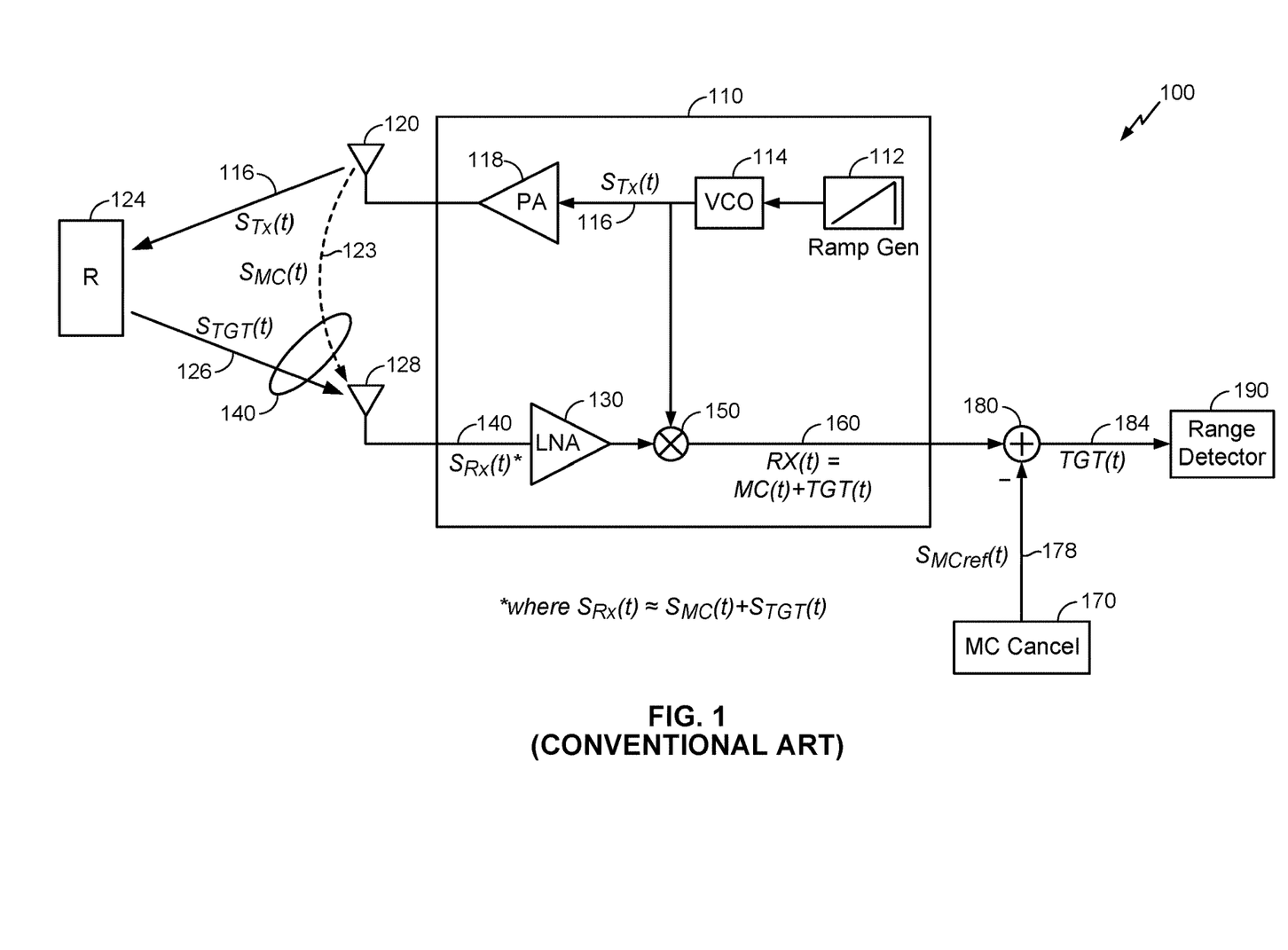
FIG. 1 is a functional block diagram of an apparatus implementing a conventional method of mitigating mutual coupling leakage in FMCW radar on a 5G communication device.

FIG. 1 is a functional block diagram 100 illustrating an apparatus using FMCW radar for range detection, and implementing a conventional method of mitigating mutual coupling (MC) leakage on a small form factor 5G communication device. In broad terms, an FMCW module 110 operates to radiate a Tx signal 116 and receive a target reflection signal 126 (or "target reflection"). Though not depicted in FIG. 1, the received target reflection 126 would ideally be combined at signal mixer 150 with the Tx signal 116, resulting in a signal at a baseband frequency, the frequency of which signal (e.g., "tone" or "beat") is proportional to the range of the target object 124 from the communication device containing the FMCW module 110. In actuality, the small form factor of the 5G communication device necessitates a very close proximity of the radiating antenna 120 to the receiving antenna 128. The Tx signal 116 is consequently received unavoidably as a mutual coupling (MC) leakage signal 123 (or more simply, "MC leakage") at the receiving antenna 128 simultaneously with the target reflection 126. The MC leakage 123 typically has significantly more power than the target reflection 126, on the order of +20 dB, for example, and may therefore obscure the target reflection 126 as received at the receiving antenna 128, making the target reflection 126 difficult, if not impossible, to detect and analyze for a range estimate. In addition to the chirp waveform of Tx signal 116, the MC leakage 123 may also include waveform components due to multipath and nonlinear distortion. It is recognized, however, that MC leakage 123, though at a much higher power than the target reflection 126, changes slowly over time.

Conventionally, a characterization of the MC leakage 123 may be stored on the 5G communications device at the time of manufacture and used to generate a corresponding MC reference signal 178 intended to correlate with the MC leakage 123 and mitigate its effect. Characterizing the MC leakage 123 robustly and reliably may be challenging, however. For example, while the stored characterization remains static over time, changes in antenna impedance and/or load may occur, causing a divergence in character of the MC leakage 123 from the stored characterization, even though the stored characterization may have been accurate when first configured. It has also been shown that external modifications to a communications device, such as a user-installed cover, for example, may also alter the characteristics of the MC leakage 123. MC leakage 123 is regarded as changing slowly over time, but leading nevertheless to eventual divergence of the stored characterization from actuality, and thus deficient mitigation of the effects of MC leakage 123

Referring to FIG. 1 in more detail, in accordance with FMCW radar techniques, at an FMCW module 110, a linear ramp signal is generated at a ramp generator 112 and used to modulate an oscillating signal generated at a voltage controlled oscillator 114 to produce the waveform for the Tx signal 116 ($S_{Tx}(t)$). The Tx signal 116 is therefore characterized as a frequency modulated sinusoid waveform, where the frequency changes linearly with time, which is commonly referred to as a "chirp," "chirp-modulated waveform," or similar. The chirp waveform is especially useful for FMCW radar ranging applications, and both an ascending chirp and a two-mode ascending/descending chirp are known to be used. The Tx signal 116 is directed to a power amplifier (PA) 118, where it is boosted for transmission at the radiating antenna 120. It will be appreciated for the purposes of simplifying discussion that the essential character of the waveform of the Tx signal 116 ($S_{Tx}t$)) remains unchanged before and after the PA 118, and the Tx signal 116 will be referred to herein without confusion as the same signal, $S_{Tx}(t)$, on both the input and output sides of the PA 118.

Referring now to FIGS. 2A-F, it will be observed that in the plots shown, the axes are labeled 't' for time and 'a' for amplitude. However, it should be understood that no quantitative representation of the signal amplitude, frequency, or phase is suggested or implied. Rather, the plots of FIGS. 2A-F are intended to provide qualitative visualizations and comparisons of the various waveforms and their relative amplitudes, frequencies, and phases.

Figure 2A:
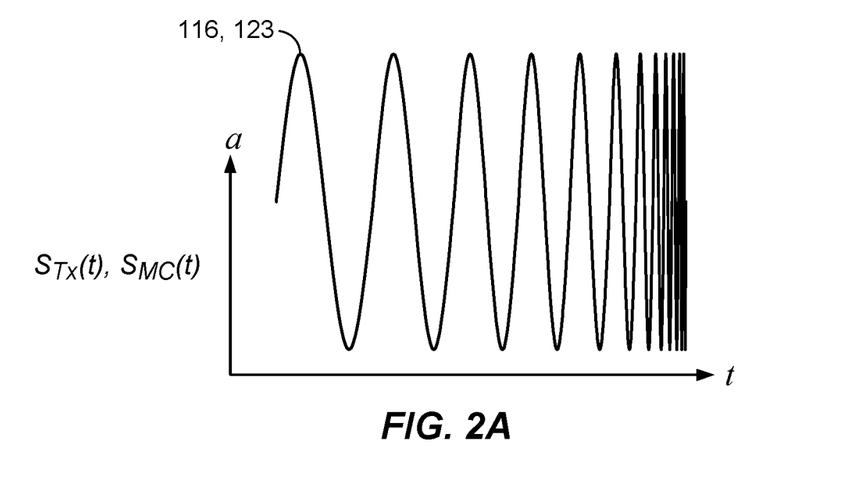
FIGS. 2A-2F illustrate waveforms at various stages of conventional processing.

A time domain representation of the Tx signal 116 ($S_{Tx}(t)$) is shown in FIG. 2A, where the increasing frequency of the sinusoid may be readily observed. This waveform is also labeled as $S_{MC}(t)$, corresponding with MC leakage 123.

Figure 2B:
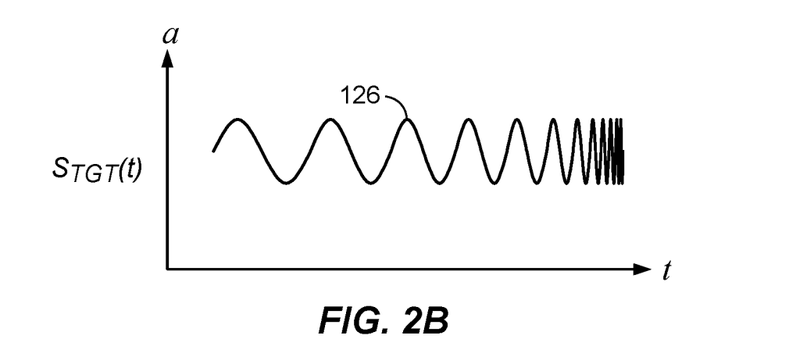
Figure 2C:
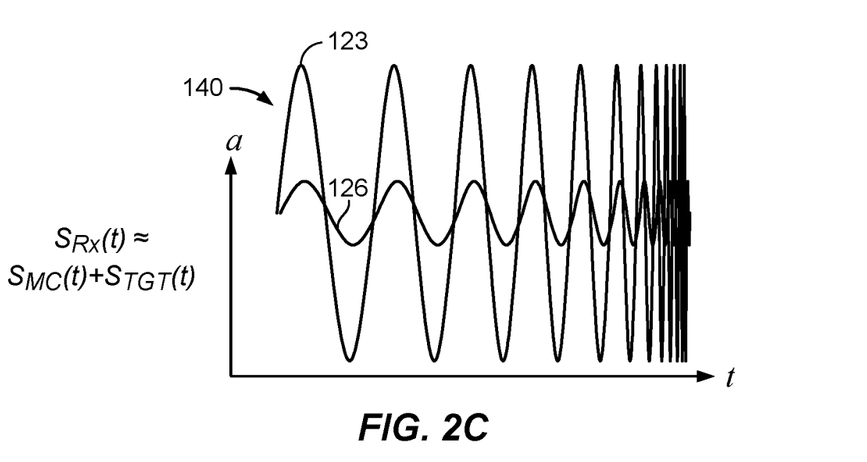

Referring again to FIG. 1, the Tx signal 116 ($S_{Tx}(t)$) is radiated at the radiating antenna 120 and eventually reaches the target object 124. The Tx signal 116 is reflected by the target object 124 and received at the receiving antenna 128 as a target reflection 126. A time domain representation of the target reflection 126 ($S_{TGT}(t)$) is illustrated in FIG. 2B. The Tx signal 116 radiated at the radiating antenna 120 is also received at the receiving antenna 128 as an MC leakage 123 ($S_{MC}(t)$). For typical FMCW use, the receiving antenna 128 is configured to operate simultaneously with the radiating antenna 120, which results in a composite of the MC leakage 123 and the target reflection 126 such that the received Rx signal 140 ($S_{Rx}(t)$) may be expressed as $S_{Rx}(t) \approx S_{MC}(t) + S_{TGT}(t)$. FIG. 2C illustrates conceptually the Rx signal 140 as a composite of the MC leakage 123 and the target reflection 126. Importantly, it will be appreciated that the power of the MC leakage 123 is relatively much greater than that of the target reflection 126. As mentioned above, the power disparity may be of the order of 20 dB. Note again that no suggestion of quantitative amplitude, frequency, or phase relationships between $S_{MC}(t)$ and $S_{TGT}(t)$ as depicted in FIG. 2C is suggested or implied. Further, the sinusoidal chirp waveforms used to depict $S_{MC}(t)$ and $S_{TGT}(t)$ are idealized, and it will be appreciated that actual examples of these waveforms may vary significantly from the depicted idealized chirps. Indeed, both $S_{MC}(t)$ and $S_{TGT}(t)$ may be altered substantially by multipath effects and other distortions.

Shown in FIG. 1, the Rx signal 140 is routed to a low noise amplifier (LNA) 130 for power boosting. Since there are substantially no changes to the character of the Rx signal 140 at the output of the LNA 130 from its input, the Rx signal 140 is referred to herein likewise the same at both the input and output of the LNA 130.

Figure 2D:
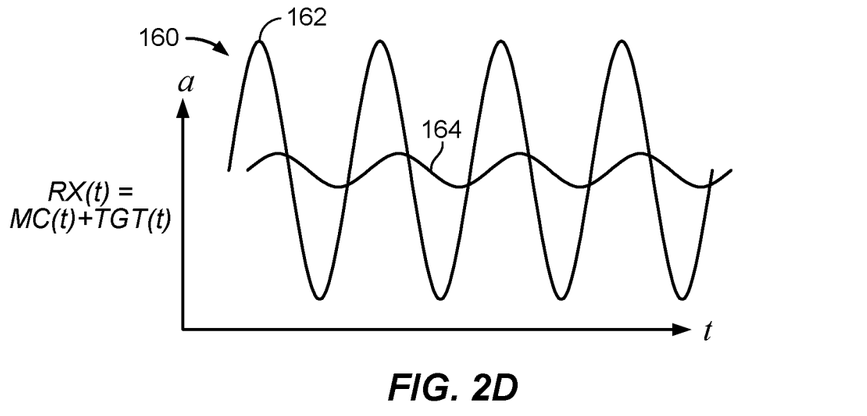
Figure 2E:
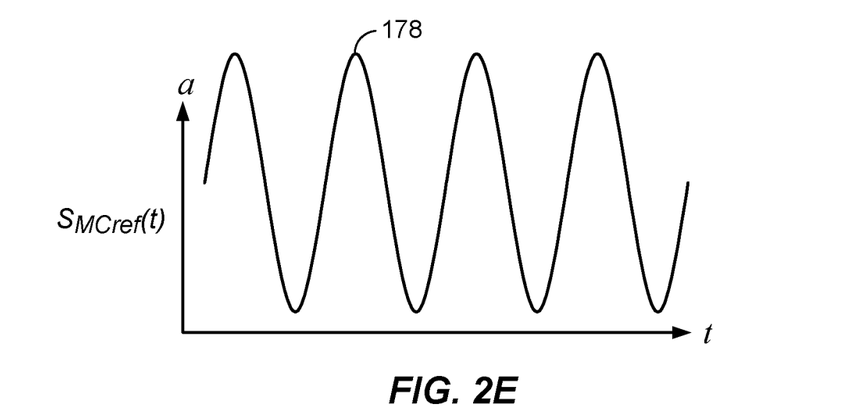

Per typical FMCW processing, the Rx signal 140 is routed to a signal mixer 150, where it is mixed with the Tx signal 116. An effect of the mixing is to remove the chirp modulation component from the waveform of the Rx signal 140. As shown in FIG. 2D, the output at the signal mixer 150 is accordingly a composite "beat" waveform 160 (RX(t), referred to herein as "composite beat"), including as component waveforms an MC leakage beat 162 (MC(t)) and a target beat 164 (TGT(t)). The composite beat 160 may be expressed for purposes herein as RX(t)=MC(t)+TGT(t). The relative amplitudes of the two component waveforms, as depicted in FIG. 2D, demonstrate the higher power of the MC leakage beat 162 over that of the target beat 164, similarly to the relative amplitudes of corresponding MC leakage 123 and target reflection 126 shown in FIG. 2C. Again, no quantitative expressions of the amplitudes or relative phases of the component waveforms are intended or implied; instead, conceptual depictions are provided. Given the greater power of the MC leakage beat 162, an object of subsequent processing is to remove the effect of the MC leakage beat 162 and isolate the target beat 164 for target range estimation. Failure to effectively isolate the target beat 164 may result in faulty range estimates due to the power of the MC leakage beat 162 obscuring the target beat 164.

Figure 2F:
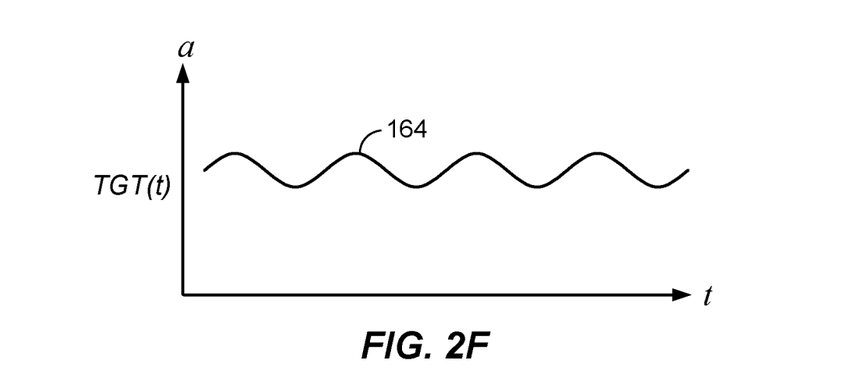

As mentioned above, in conventional methods a characterization of the MC leakage effect (i.e., the MC leakage beat 162) may be determined and stored on the 5G communications device at the time of manufacture. In FIG. 1, at an MC Cancelation module 170, an MC reference signal 178 ($S_{MCref}(t)$ and "MC reference") may be generated from the stored characterization as a modeled version of the MC leakage beat 162. Indeed, a waveform of the MC reference 178, illustrated in FIG. 2E, will be observed as resembling the MC leakage beat 162 depicted in FIG. 2D. An essential goal, however, is for the MC reference 178 to correlate highly with the MC leakage beat 162. The MC reference 178 is then negative-summed with the composite beat 160 at a signal summer 180, ostensibly removing the MC leakage beat 162 component and leaving relatively undisturbed the target beat 164, which is illustrated in FIG. 2F. The remaining target beat 164 may then be directed to a range detector 190, where an estimated range to the target object 124 may be determined. In accordance with FMCW radar processing, the frequency of the target beat 164 (i.e., its "tone") is proportional with the distance to the target object 124.

The effectiveness of the MC reference 178 in canceling the MC leakage beat 162 depends, however, on the accuracy with which the MC reference 178 models, and correlates with, the MC leakage beat 162. The model fidelity in turn depends upon the accuracy of the characterization of the MC leakage 123 that was stored during manufacture. As discussed in the foregoing, changes in antenna impedance and/or load, or simply the installation of a cover on the communication device, for example, may cause the actual character of the MC leakage 123 and/or MC leakage beat 162 to diverge from the conventionally stored characterization. The stored characterization may then become increasingly deficient with regard to canceling the effects of MC leakage beat 162.

By contrast, a differential approach according to aspects described herein provides an adaptive means for canceling MC leakage in small form factor 5G communication devices, as used for millimeter wave communications. Instead of canceling high power leakage from the radiating antenna to the receiving antenna with a waveform derived from a static and possibly inaccurate reference characterization, aspects described herein provide for the use instead of a previous observation at t-k of the received, mixed waveform as a "reference" to cancel MC leakage from the current observation at t.

Figure 3:
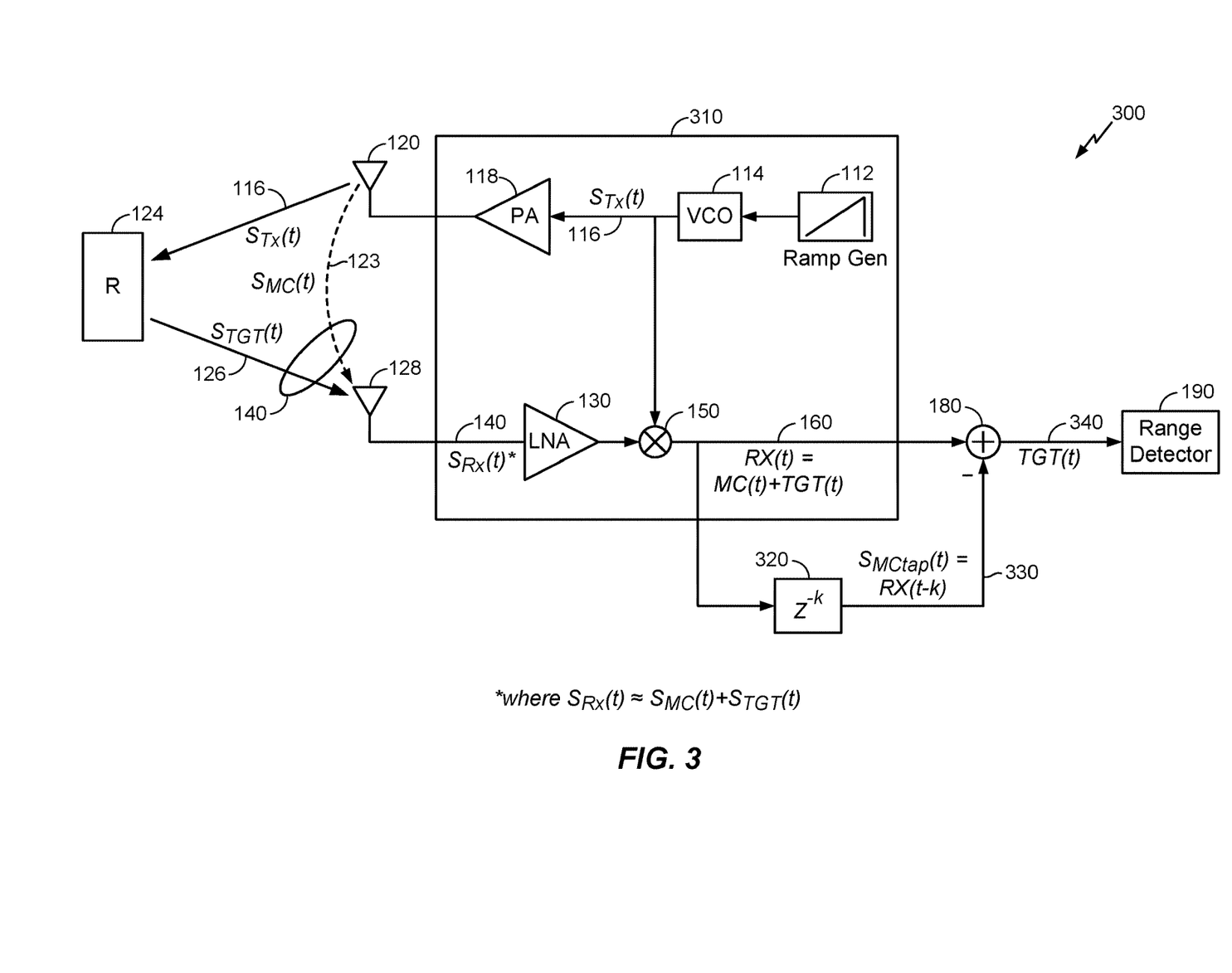
FIG. 3 is a functional block diagram illustrating an apparatus for mitigating mutual coupling leakage in FMCW radar on a 5G communication device according to differential methods disclosed herein.

FIG. 3 is a functional block diagram 300 of an example apparatus for mitigating MC leakage in a small form factor device, such as a 5G communication device, in accordance with various aspects disclosed herein. It will be observed that the block diagram 300 is similar to the block diagram 100 of FIG. 1. In the interests of avoiding repetition, explanations regarding details of common elements in FIGS. 1 and 3 will be found above in disclosure related to FIGS. 1 and 2A-F. Accordingly, the following discussion of the signal flow in an FMCW module 310 can begin at the signal mixer 150. It will be appreciated that the signal processing leading up to the signal mixer 150 is substantially the same as that which is described with regard to FIG. 1.

Figure 4A:
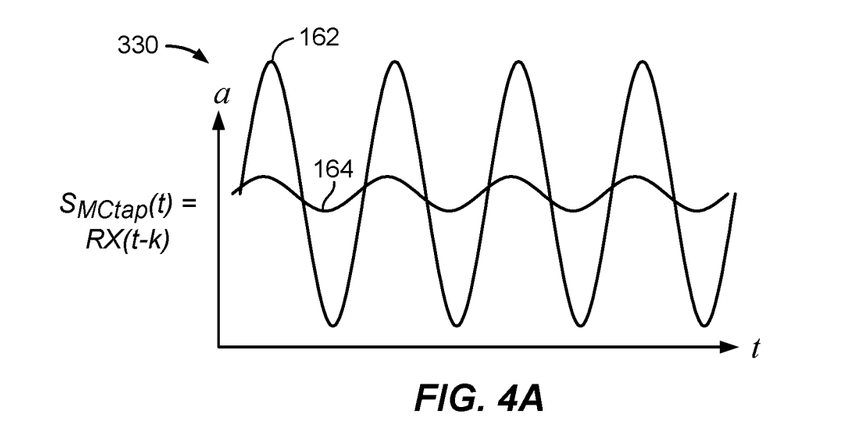
FIGS. 4A and 4B illustrate waveforms during stages of processing according to aspects regarding differential methods disclosed herein.
Figure 4B:
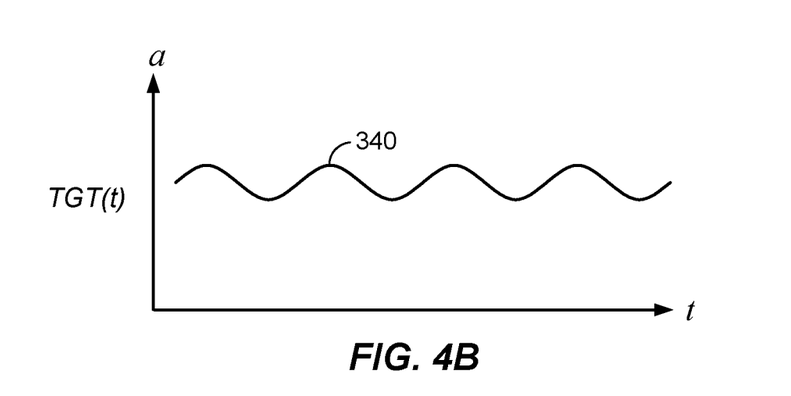

Referring to FIG. 3, at the output of the signal mixer 150 is a composite beat 160 (RX(t)) waveform comprising as component waveforms an MC leakage beat 162 (MC(t)) and a target beat 164 (TGT(t)), as illustrated in FIG. 2D. A tap 320 may be provided to capture the signal stream at the output of the signal mixer 150, at a delay of k samples. The k-delayed composite beat 324 waveform (RX(t-k)) is routed to a weighting module 328, where complex scalar weight W is applied. Weight W is typically close to 1 in value. Aspects provide that the weight W may be preconfigured and fixed, configurable at any time, and/or adaptive in real time. The resulting waveform is MC reference signal 330 ($S_{MCtap}(t)$, "MC reference"), which may be expressed as $S_{MCtap}(t)$ =W*RX(t-k). $S_{MCtap}(t)$ is illustrated in FIG. 4A, comprising component waveforms MC leakage beat 162, MC(t-k), and target beat 164, TGT(t-k). As with the waveform plots provided herein, no quantitative expression of amplitude or phase is suggested or implied by the plot of FIG. 4A, but rather a qualitative, conceptual description is provided. The MC reference 330, $S_{MCtap}(t)$, is then negative-summed with the composite beat 160 at signal summer 180, yielding the target beat 340, TGT(t), illustrated in FIG. 4B. The target beat 340 may then be routed to the range detector 190 where a range between the communications device and target object 124 may be estimated based on the frequency (tone) of the target beat 340.

The efficacy of using the MC reference 330 to cancel the MC leakage beat 162 of the composite beat 160 is based in part on similarities of MC reference 330 ($S_{MCtap}(t)$), to composite beat 160 (RX(t)). A comparison of $S_{MCtap}(t)$, illustrated in FIG. 4A, with RX(t), illustrated in FIG. 2D, points up such similarities between the two signals. More precisely:

$$RX(t)=MC(t)+TGT(t) \quad (1)$$

$$S_{MCtap}(t)=W*RX(t-k)=W*MC(t-k)+W*TGT(t-k) \quad (2)$$

A strong similarity between $S_{MCtap}(t)$ and RX(t) exists because $S_{MCtap}(t)$ is simply a k-delayed, scalar-multiplied sample of RX(t). Also, MC(t) is expected to remain relatively unchanged over time periods of interest (e.g., 100 milliseconds) due to its repetitive, high-power (chirp) content. MC(t-k) and MC(t) may then be regarded as highly correlated, and MC(t-k) therefore effective for canceling MC(t).

TGT(t) and TGT(t-k) are regarded, by contrast, as being uncorrelated. In an example discussed above, the target object 124 may be human. A human target, such as a finger, hand, or other body part, may be modeled as a relatively soft, non-flat target, as opposed to a desk, chair, or many other inanimate objects with hard, flat surfaces. As such, a (non-flat) human target may create multi-scattered FMCW radar reflections, with paths that may add constructively and destructively to cause phase fluctuations in the reflected signals. Further, a human target may also be in motion, even at a millimeter level when a subject is regarded as not moving. Such a "micro-movement" of a hand, for example, may induce random phase fluctuations in a received millimeter wave target reflection signal. These phase fluctuations may cause variations in the target reflection signal taken over time such that TGT(t)≠TGT(t-k). Thus, TGT(t) and TGT(t-k) may be regarded as being uncorrelated, and TGT(t-k) will not cancel TGT(t). Negative-summing W*RX(t-k) (i.e., MC reference 330, $S_{MCtap}(t)$) and RX(t), composite beat 160, therefore substantially yields TGT(t) 340, and the range detector 190 may then make a determination of the range to the target object 124 based on TGT(t).

In another example, the target object 124 may be a stationary object with one or more flat surfaces, such as book or laptop computer. Phase fluctuations such as those inherent to a human target will not be present and the target beat 164 component, i.e., TGT(t), of Rx(t) should remain substantially constant. Thus, TGT(t) will be similar to, and correlate strongly with, W*TGT(t-k), such that TGT(t) may be canceled from RX(t) at the signal summer 180 along with the MC(t) component. The substantially null signal results in no subsequent detections at the range detector 190. Thus, for the purposes of managing maximum permissible exposure to a human target, for example, cancelation of the target signal (TGT(t)) for stationary, relatively flat-surfaced objects is advantageous in that the likelihood of a false alarm is reduced.

The amount of delay in absolute time between RX(t) and $S_{MCtap}(t)$ (i.e., RX(t-k)) may be determined by the configurable parameter k and a sample period T. The value of k may be configured so that MC(t-k) and MC(t) are substantially and sufficiently correlated so that MC(t) is effectively canceled, but also that TGT(t) and TGT(t-k) are sufficiently decorrelated so that TGT(t) is not canceled. In an aspect, cancelation of MC(t) is achieved when performed periodically with a period of T, or a multiple thereof. In an example where the target is human, k may be determined by the relationship between T and a frequency of a human micromovement. In an example, if T is set at 50 milliseconds, it has been shown experimentally that k may be set to a value of 6 or more. According to another aspect, k may simply be set to 1. According to other aspects, k may be determined by any method as a value best ensuring cancelation of the effects of MC leakage 123 while isolating and returning the target beat 164, TGT(t).

It will be appreciated that cancelation of MC leakage energy by differential methods is advantageous at least because the conventional dependency on a stored leakage model reference is removed. As discussed, the factory reference configured during manufacture may become unreliable due, for example, to the addition by the user of a cover on the communications device, or to evolving changes in antenna impedance and/or loads. By contrast, the differential methods described herein provide a leakage canceling reference that is inherently dynamic, adaptable, and advantageously unaffected by these types of changes.

Figure 5:
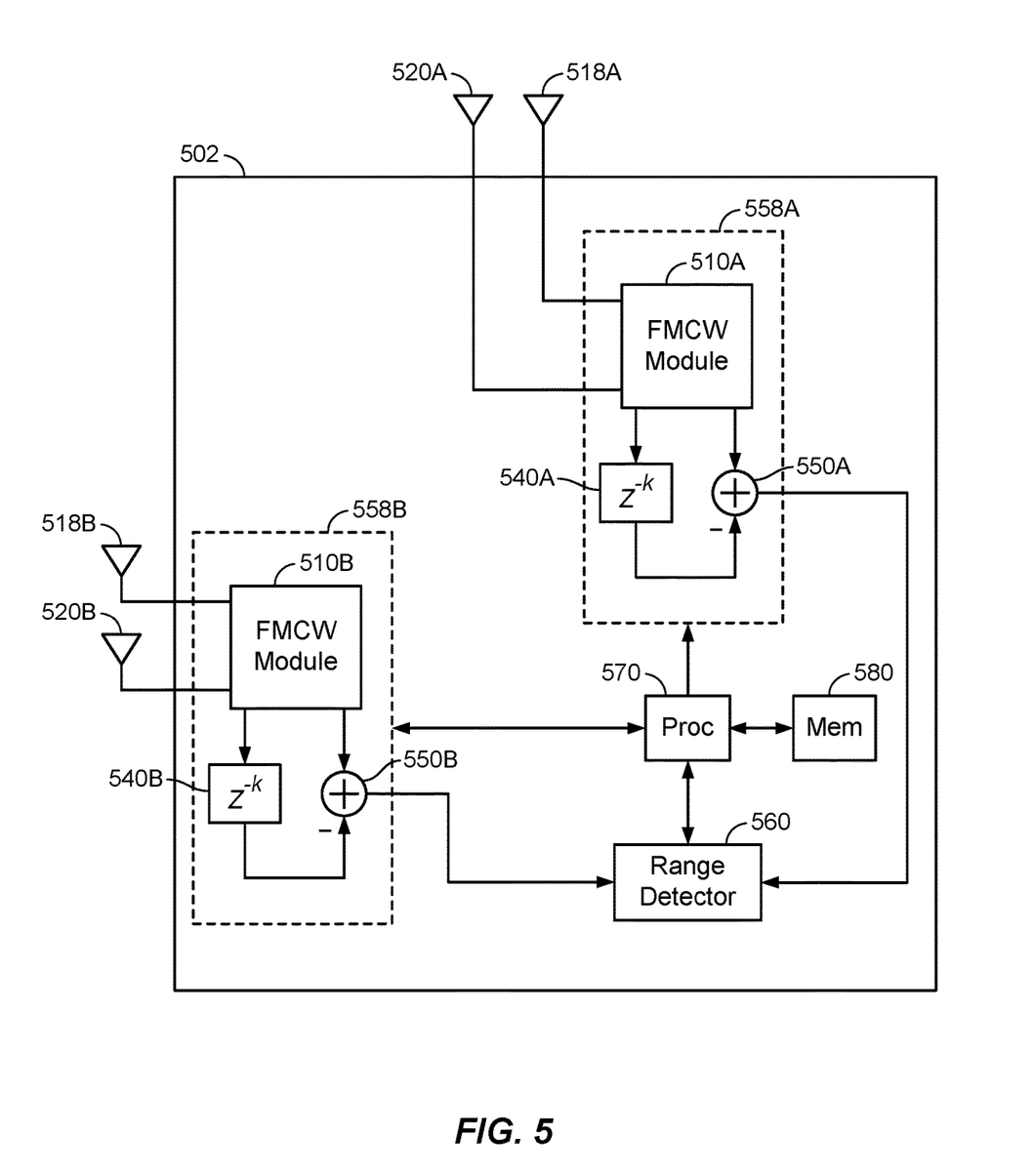
FIG. 5 is a functional block diagram of an example 5G communication device according to aspects disclosed herein.

FIG. 5 is a functional block diagram 500 of a small form factor 5G communication device 502 according to aspects disclosed herein. The 5G communication device 502 includes antenna modules 558A, 558B, which may both be operable for general 5G communications functions, and for performing FMCW radar and MC leakage mitigation according to various aspects. As depicted, the antenna modules 558A, 558B are identical, though it is contemplated that antenna modules may vary in terms of components, configuration, and function in addition to those discussed herein. Further, while two antenna modules 558A, 558B are depicted, implementations may include more or fewer antenna modules.

As shown, antenna modules 558A, 558B each substantially include an apparatus for leakage mitigation as illustrated in FIG. 3. For example, antenna modules 558A, 558B include respective FMCW modules 510A, 510B, radiating antennas 518A, 518B, receiving antennas 520A, 520B, delay taps 540A, 540B, and signal summers 550A, 550B. Outputs from the signal summers 550A, 550B are directed to a range detector 560. Though one range detector 560 is shown coupled commonly to both antenna modules 558A, 558B, other embodiments provide for an individual range detector for each antenna module 558A, 558B, for example.

The function of the MC leakage mitigation portion of antenna module 558A is the same as described above with regard to FIG. 3. That is, when an FMCW chirp waveform is transmitted at the radiating antenna 518A, it may be received at receiving antenna 520A as high energy MC leakage simultaneously with a target reflection signal at substantially lower power. Using the differential methods described herein, circuitry and/or logic of the FMCW module 510A operate to remove the energy of the MC leakage and isolate the target reflection energy for use in a target range determination.

According to an aspect, the 5G communication device 502 includes a processor 570 functionally coupled to a memory 580, the range detector 560, and the antenna modules 558A, 558B. The processor 570 may execute instructions including those for controlling the antenna modules 558A, 558B, controlling the range detector 560, receiving FMCW range data from the range detector 560, classifying the FMCW range data, and storing and accessing the range data at the memory 580.

In an example, the processor 570 may classify FMCW radar range data generated by antenna module 558B, for example, and determine that a human target is within 1 cm, which may be cause for power management to maintain MPE adherence. The processor 570 may also determine that no such detections are present via the other antenna module 558A. A prospective 5G communication queued for transmission using antenna module 558B at a power exceeding MPE at the 1 cm range may then be reassigned to antenna module 558A for transmission on the expectation that no human tissue is in danger of over-exposure to 5G communication transmission energy.

It will be appreciated that the functional blocks of the 5G communication device 502 may be implemented in various combinations in hardware, firmware, and/or software. For small form factor devices such as the 5G communication device 502, all or some of the functions of all modules depicted may be integrated into a System on Chip (SoC), or into the processor 570 and/or memory 580.

Figure 6:
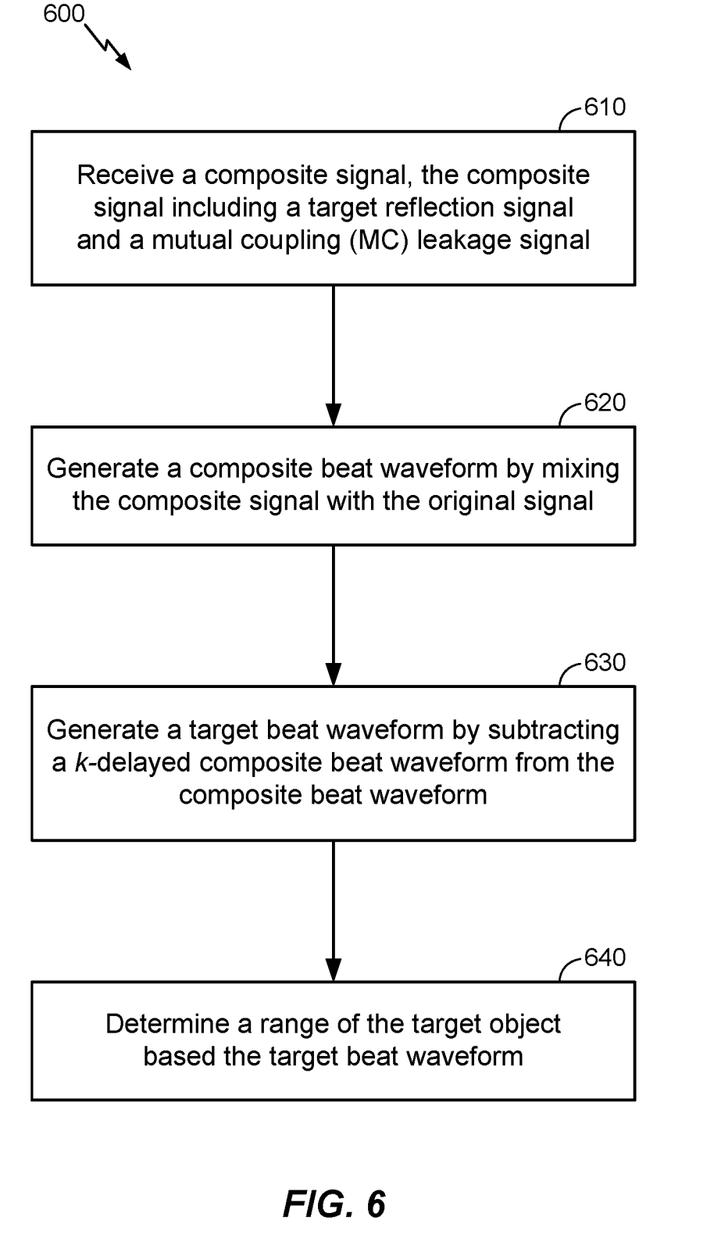
FIG. 6 is a flowchart depicting a method of mitigating mutual coupling leakage and determining a target range according to aspects disclosed herein.

FIG. 6 is a flowchart depicting a method 600 of mitigating MC leakage and determining a target range according to aspects disclosed herein. At block 610, a composite signal is received. In an aspect, the composite signal is Rx signal 140 received at the receiving antenna 128 of an FMCW module 310. The composite signal includes a target reflection signal, such as target reflection 126, and an MC leakage signal, such as MC leakage 123. The target reflection signal may be regarded as a reflection from a target object of an original Tx signal, which may be a chirp-modulated waveform in accordance with FMCW radar operation. The power of the target reflection signal may be diminished at least due to the transmission distance to and from the target, such as target object 124, and energy absorption characteristics of the target surface. The MC leakage signal may be at a significantly higher power level than the target reflection signal due not only to the reduced power of the target reflection signal, but also to the very close proximity of the radiating antenna to the receiving antenna. The power disparity between the MC leakage signal and target reflection signal may be on the order of 20 dB, though it will be appreciated that this is an estimate and that actual power disparities may vary significantly. Due to the power disparity, however, the target reflection signal may be undetectable in the composite signal as a whole. The received composite signal may be power boosted, such as by an LNA 130.

At block 620, a composite beat waveform, such as composite beat 160, is generated by mixing the composite signal with the original signal, such as the Tx signal 116. In this way, the chirp modulation of the composite signal is removed, including from its component MC leakage and the target reflection waveforms. A comparison of idealized MC leakage and target reflection waveforms depicted in FIGS. 2C and 2D illustrates the effect of mixing with the original signal, e.g., the Tx signal 116. The result of mixing is a composite beat waveform comprising a sinusoidal "beat" derived from each of the target reflection and MC leakage waveform components of the composite signal, such as MC(t) and TGT(t) depicted in FIG. 2D.

At block 630, a target beat waveform, such as target beat 340, is generated by subtracting a weighted, k-delayed composite beat waveform from the composite beat waveform at time k. Essentially, the target beat waveform is isolated from the composite beat waveform by canceling the MC leakage beat waveform. As discussed in more detail above in relation to FIG. 3, the MC leakage beat waveform at time t-k, MC(t-k), may be regarded as highly correlated with the MC leakage beat waveform at time t, MC(t), and that MC(t-k) is therefore effective for canceling MC(t) from the composite beat waveform. By contrast, the target beat waveform at time t-k, TGT(t-k), may be regarded as uncorrelated with the target beat waveform at time t, TGT(t), and therefore negative-summing TGT(t-k) with TGT(t) does not cancel TGT(t), and the residual from the summing is simply the target beat waveform, TGT(t).

At block 640, the target beat waveform may be used to make a determination as to the range of the target object, such as target object 124. Known FMCW radar methods may be used at a range detector receiving the target beat waveform, such as range detector 190, to determine range estimate from its "beat" frequency (i.e., "tone"), by its proportionality to the distance to the target object. As discussed above, a range estimate may then be provided to a processor, such as processor 570, for classification and further action.

Those having skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those having skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

A small form factor device will be recognized by those having skill in the art as a device designed to minimize size, and that as technologies advance there is an abiding interest in further miniaturization. In particular, for small form factor 5G communication devices such as those contemplated herein, the high frequencies utilized not only present new technological opportunities, such as the inclusion of frequency modulated continuous wave (FMCW) radar using existing transmit and receive antennas. Some or all of the functions of the modules depicted herein may also be advantageously integrated into a System on Chip (SoC) to minimize size and power consumption.

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art.

An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of determining, on a small form factor communication device, a range of a target object, comprising:
   receiving, at a receiving antenna of the small form factor communication device, a composite signal, the composite signal including a target reflection signal and a mutual coupling (MC) leakage signal;
   generating, at the small form factor communication device, a composite beat waveform by mixing the composite signal with an original signal;
   generating a target beat waveform by subtracting from the composite beat waveform a k-delayed composite beat waveform; and
   determining, using the target beat waveform, a range of the target object from the small form factor communication device.

2. The method of claim 1, wherein:
   the target reflection signal is a reflection from the target object of the original signal; and
   the MC leakage signal is the original signal radiated from a radiating antenna and received at the receiving antenna of the small form factor communication device.

3. The method of claim 2, wherein the receiving antenna is configured for simultaneous reception of the target reflection signal and the MC leakage signal.

4. The method of claim 1, wherein the composite beat waveform includes a leakage beat waveform and the target beat waveform.

5. The method of claim 4, wherein k is a configurable parameter.

6. The method of claim 5, wherein k is configured to cause a k-delayed leakage beat waveform of the k-delayed composite beat waveform to be correlated with the leakage beat waveform.

7. The method of claim 5, wherein k is configured to cause a k-delayed target beat waveform of the k-delayed composite beat waveform to be uncorrelated with the target beat waveform.

8. The method of claim 1, wherein the original signal is frequency modulated, the frequency changing linearly over time.

9. The method of claim 1, wherein the small form factor communication device operates at a millimeter wave bandwidth.

10. The method of claim 1, wherein the power of the MC leakage signal is greater than the power of the target reflection signal.

11. An apparatus for determining, on a small form factor communication device, a range of a target object, comprising:
    a receiving antenna for receiving a composite signal, the composite signal including a target reflection signal and a mutual coupling (MC) leakage signal;
    a signal mixer for generating a composite beat waveform by mixing the composite signal with an original signal;
    a signal summer for generating a target beat waveform by subtracting from the composite beat waveform a k-delayed composite beat waveform; and
    a range detector for determining, using the target beat waveform, the range of the target object from the small form factor communication device.

12. The apparatus of claim 11, wherein:
    the target reflection signal is a reflection of the original signal from the target object; and
    the MC leakage signal is the original signal radiated from a radiating antenna of the small form factor communication device.

13. The apparatus of claim 12, wherein the receiving antenna is configured for simultaneous reception of the target reflection signal and the MC leakage signal.

14. The apparatus of claim 11, wherein the composite beat waveform includes a leakage beat waveform and the target beat waveform.

15. The apparatus of claim 14, wherein k is a configurable parameter.

16. The apparatus of claim 15, wherein k is configured to cause a k-delayed leakage beat waveform of the k-delayed composite beat waveform to be correlated with the leakage beat waveform.

17. The apparatus of claim 15, wherein k is configured to cause a k-delayed target beat waveform of the k-delayed composite beat waveform to be uncorrelated with the target beat waveform.

18. The apparatus of claim 11, wherein the original signal is frequency modulated, the frequency changing linearly over time.

19. The apparatus of claim 11, wherein the small form factor communication device operates at a millimeter wave bandwidth.

20. The apparatus of claim 11, wherein the power of the MC leakage signal is greater than the power of the target reflection signal.

21. An apparatus for determining, on a small form factor communication device, a range of a target object, comprising:
    means for receiving, at the small form factor communication device, a composite signal, the composite signal including a target reflection signal and a mutual coupling (MC) leakage signal;
    means for generating, at the small form factor communication device, a composite beat waveform by mixing the composite signal with an original signal;
    means for generating a target beat waveform by subtracting from the composite beat waveform a k-delayed composite beat waveform; and
    means for determining, using the target beat waveform, a range of a target object from the small form factor communication device.

22. The apparatus of claim 21, wherein:
the target reflection signal is a reflection from the target object of the original signal; and
the MC leakage signal is the original signal radiated from a means for radiating and received at the means for receiving at the small form factor communication device.

23. The apparatus of claim 22, wherein the means for receiving is configured for simultaneous reception of the target reflection signal and the MC leakage signal.

24. The apparatus of claim 21, wherein the composite beat waveform includes a leakage beat waveform and the target beat waveform.

25. The apparatus of claim 24, wherein k is a configurable parameter.

26. The apparatus of claim 25, wherein k is configured to cause a k-delayed leakage beat waveform of the k-delayed composite beat waveform to be correlated with the leakage beat waveform.

27. The apparatus of claim 25, wherein k is configured to cause a k-delayed target beat waveform of the k-delayed composite beat waveform to be uncorrelated with the target beat waveform.

28. The apparatus of claim 21, wherein the original signal is frequency modulated, the frequency changing linearly over time.

29. The apparatus of claim 21, wherein the small form factor communication device operates in a millimeter wave bandwidth.

30. The apparatus of claim 21, wherein the power of the MC leakage signal is greater than the power of the target reflection signal.

31. A non-transitory computer-readable storage medium comprising code, which, when executed by a processor on a small form factor communication device, causes a determination of a range of a target object, the non-transitory computer-readable storage medium comprising:
code for receiving a composite signal, the composite signal including a target reflection signal and a mutual coupling (MC) leakage signal;
code for generating a composite beat waveform by mixing the composite signal with an original signal;
code for generating a target beat waveform by subtracting from the composite beat waveform a k-delayed composite beat waveform; and
code for receiving determining, using the target beat waveform, a range of a target object from the small form factor communication device.

32. The non-transitory computer-readable storage medium of claim 31, wherein:
the target reflection signal is a reflection from the target object of the original signal; and
the MC leakage signal is the original signal radiated from a radiating antenna and received at a receiving antenna of the small form factor communication device.

33. The non-transitory computer-readable storage medium of claim 32, wherein the receiving antenna is configured for simultaneous reception of the target reflection signal and the MC leakage signal.

34. The non-transitory computer-readable storage medium of claim 31, wherein the composite beat waveform is a combination of a leakage beat waveform and the target beat waveform.

35. The non-transitory computer-readable storage medium of claim 34, wherein k is a configurable parameter.

36. The non-transitory computer-readable storage medium of claim 35, wherein k is configured to cause a k-delayed leakage beat waveform of the k-delayed composite beat waveform to be correlated with the leakage beat waveform.

37. The non-transitory computer-readable storage medium of claim 35, wherein k is configured to cause a k-delayed target beat waveform of the k-delayed composite beat waveform to be uncorrelated with the target beat waveform.

38. The non-transitory computer-readable storage medium of claim 31 wherein the original signal is frequency modulated, the frequency changing linearly over time.

39. The non-transitory computer-readable storage medium of claim 31, wherein the small form factor communication device operates in a millimeter wave bandwidth.

40. The non-transitory computer-readable storage medium of claim 31, wherein the power of the MC leakage signal is greater than the power of the target reflection signal.

* * * * *